United States Patent
Braun et al.

(10) Patent No.: US 7,116,447 B2
(45) Date of Patent: Oct. 3, 2006

(54) HALFTONE DOT-GROWTH TECHNIQUE USING A DOT EDGE-DETECTION SCHEME

(75) Inventors: Gustav J. Braun, Fairport, NY (US); Peter D. Burns, Fairport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 1016 days.

(21) Appl. No.: 10/154,546

(22) Filed: May 24, 2002

(65) Prior Publication Data

US 2003/0218780 A1  Nov. 27, 2003

(51) Int. Cl.
*H04N 1/405* (2006.01)
*H04N 1/52* (2006.01)
*H04N 1/409* (2006.01)
*H04N 1/58* (2006.01)
*G06T 5/00* (2006.01)

(52) U.S. Cl. .................. 358/3.12; 358/3.15; 358/534; 358/3.27; 382/257

(58) Field of Classification Search ............ 358/3.12, 358/3.15, 534, 3.27, 1.9, 3.09, 3.02, 3.1, 358/3.11, 3.03, 3.04; 382/256–257, 270
See application file for complete search history.

(56) References Cited

U.S. PATENT DOCUMENTS

| 4,945,422 A | 7/1990 | Ng |
| 5,208,871 A | 5/1993 | Eschbach |
| 5,250,934 A | 10/1993 | Denber et al. |
| 5,255,085 A | 10/1993 | Spence |
| 5,258,854 A | 11/1993 | Eschbach |
| 5,293,539 A | 3/1994 | Spence |
| 5,483,351 A * | 1/1996 | Mailloux et al. .......... 358/3.27 |
| 5,677,093 A | 10/1997 | Delabastita et al. |
| 5,680,485 A * | 10/1997 | Loce et al. ................ 382/257 |
| 6,115,140 A * | 9/2000 | Bresler et al. ............... 358/1.9 |
| 2001/0005270 A1 | 6/2001 | Wechgeln |

* cited by examiner

*Primary Examiner*—Kimberly Williams
*Assistant Examiner*—Charlotte M. Baker
(74) *Attorney, Agent, or Firm*—William F. Noval

(57) ABSTRACT

A method for color correcting an original halftone bitmap image by a predefined color correction function to produce a color corrected halftone bitmap image comprising: providing an original halftone bitmap image; estimating the dot area percentage of the original halftone bitmap image in a set of sub-image blocks; calculating an aim dot area percentage, based on a predefined color correction function, for each sub-image block in the original halftone bitmap image, calculating the number of halftone bitmap image pixels to convert to on or off states to produce a modified original halftone bitmap image that has the aim dot area percentage where said value is designated by N, for each sub-image block in the original halftone bitmap image, and converting N pixels in the original halftone bitmap image to either on or off states depending on whether the aim dot area percentage is greater or less than the dot area percentage of the original halftone bitmap image respectively, for each sub-image block in the original halftone bitmap image.

16 Claims, 13 Drawing Sheets

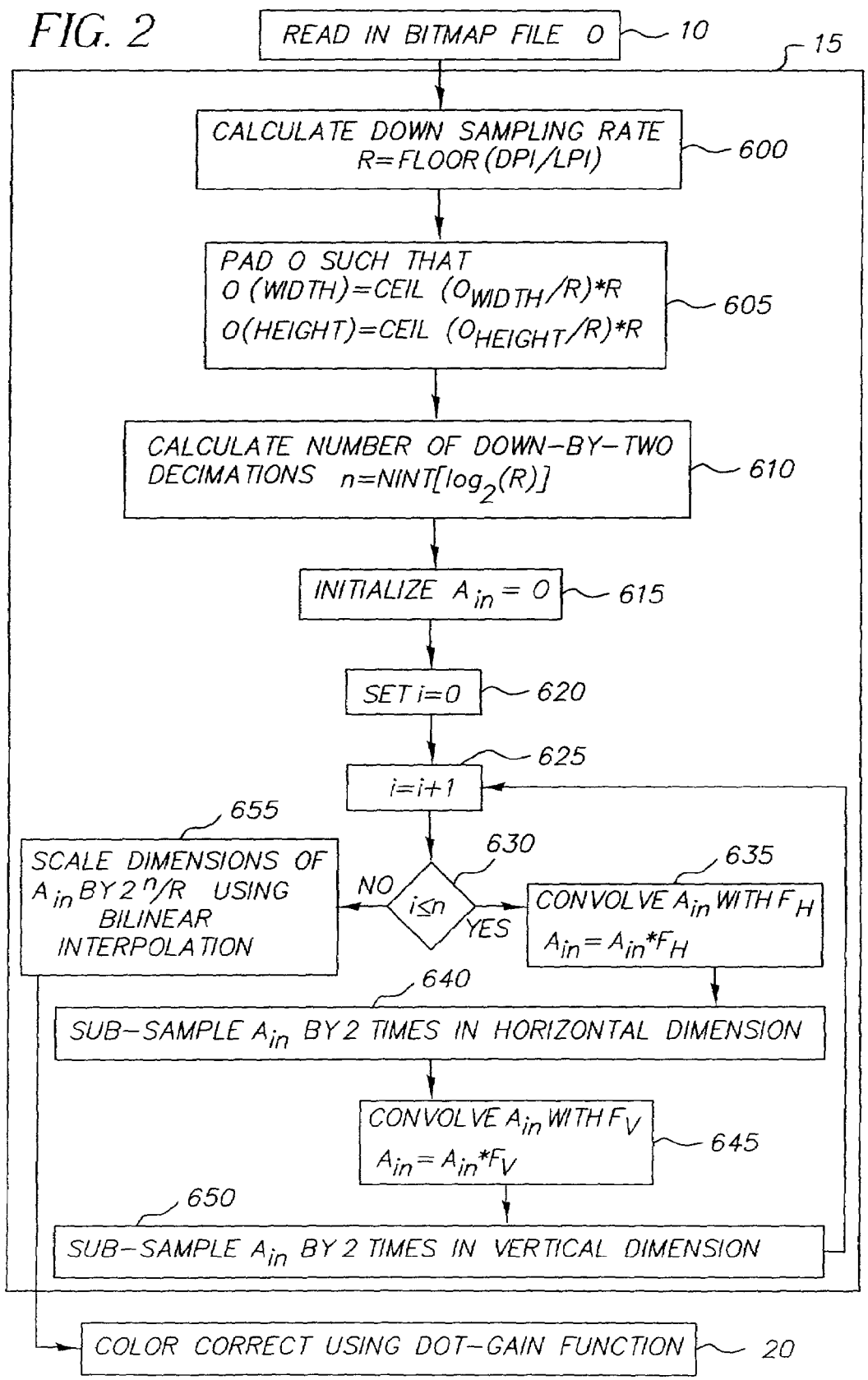

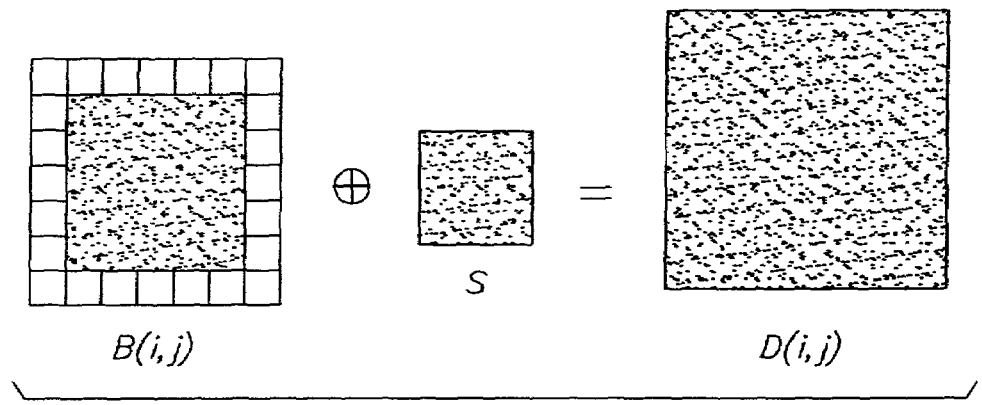
FIG. 5a
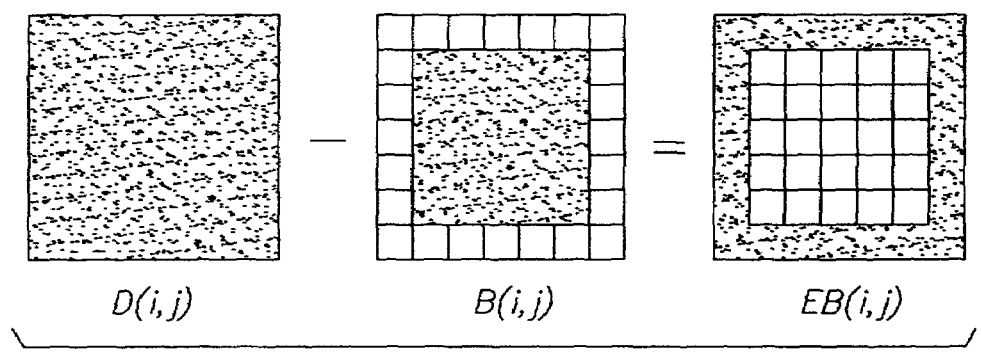
FIG. 5b
| 39 | 35 | 31 | 27 | 46 | 42 | 38 |
|----|----|----|----|----|----|----|
| 43 | 23 | 15 | 11 | 18 | 22 | 34 |
| 47 | 19 | 7  | 3  | 6  | 14 | 30 |
| 28 | 12 | 4  | 1  | 2  | 10 | 26 |
| 32 | 16 | 8  | 5  | 9  | 21 | 50 |
| 36 | 24 | 20 | 13 | 17 | 25 | 45 |
| 40 | 44 | 48 | 29 | 33 | 37 | 41 |
FIG. 6

HALFTONE DOT-GROWTH TECHNIQUE USING A DOT EDGE-DETECTION SCHEME

FIELD OF THE INVENTION

This present invention relates in general to digital halftoning imaging systems and more particularly to a digital halftone dot-growth technique using a dot edge-detection scheme.

BACKGROUND OF THE INVENTION

Digital halftoning refers to any algorithmic process which creates the illusion of continuous-tone images from the judicious arrangement of binary picture elements (pixels).

RIPing (Raster Image Processing) is the digital image processing that takes a continuous-tone image and original graphical elements and provides a binary halftoned output image file. RIPing an image file usually can include the steps of spatial filtering, interpolation, tone and color modification, and digital halftoning There is a need to control the size of the dots in a pre-existing halftone bitmap. This bitmap could have been generated by a digital screening system (i.e., a RIP) or it could have been generated by scanning an optical piece of film to create a digital bitmap file. In general, these bitmap files were created with some output device in mind. As such, the dot pattern was created to produce a given density to dot percentage relationship tailored to the target output device. If this bitmap file were printed on an output device that had different dot-gain characteristics than the target device the density as a function of dot-area percentage will be different Thus, in order to achieve the desired dot percentage to output density relationship of the target device, on a different device, the bitmap file for the target device must be modified according to the dot-gain differences between the target device and the given output device.

For most traditional digital-proofing scenarios this dot-gain compensation is done by re-RIPing the original art with a modified dot-gain curve. This modified dot-gain curve accounts for the dot-gain differences between the target device and the proofing system. Thus, a custom bitmap file needs to be generated for each output device. The main drawback to this paradigm is that the proofs may be made on systems that do not use the same screening technology as was used to create the target bitmap file. Thus, in order to support a RIP-once-output-many (ROOM) workflow the dot-gain compensation needs to be applied to the bitmap file directly The present invention offers an efficient technique to adjust the dot sizes of bitmap image files such that the color and tone of the bitmap files can be adjusted prior to printing. These bitmap files can consist of single channel bitmaps such as those for a single color device (e g, a black-and-white laser printer), those for a CMYK output device (e g., a printing press or a graphic-arts proofer), or any output device that utilizes bitmap files of any number of channels (e g, a multi-ink inkjet printer). In the present invention the color and tone of the bitmap files are adjusted by growing or shrinking the size of the bitmap dots using an erosion/dilation based halftone dot-growth technique using a dot edge-detection scheme.

In short, this technique identifies the edges of the halftone dots and either selectively adds or removes binary pixels (bitmap dots) to or from these edges to control the size of the halftone dots. The edges of the halftone dots are obtained using the morphological image processing technique of boundary detection using dilation and erosion depending on whether the dot in question needs to increase in size or decrease in size respectively. The exterior boundary of a dot feature is detected using a dilation based boundary detection process. The interior boundary of a dot feature is detected using an erosion based boundary detection process. The structuring elements used in the edge detection process can be tailored depending on the dot-growth task. The amount that a given dot percentage needs to grow or shrink is defined by a dot-gain curve.

Several approaches for dot-gain modification of bitmaps have been proposed. The dot gain may be adjusted for each of the primary colors cyan, magenta, yellow, and black. A description for how to do this is disclosed by Spence in U.S. Pat. Nos. 5,255,085 and 5,293,539 titled "ADAPTIVE TECHNIQUE FOR PROVIDING ACCURATE TONE REPRODUCTION CONTROL IN AN IMAGING SYSTEM" and "METHOD AND APPARATUS FOR CALIBRATING TONE REPRODUCTION IN A PROOFING SYSTEM". Here, percent dot area is calculated using the Murray and Davies equation from measured densities.

Denber, et. al disclose a method of shifting and ANDING a bitmap image with itself to thin the image displayed in U.S. Pat. No. 5,250,934 "METHOD AND APPARATUS FOR THINNING PRINTED IMAGES" and also teaches a method of setting a bit to an intermediate level if it is diagonally between two active bits using shifting, logical AND, and a logical OR operation.

Mailloux, et al discloses using a 4×4 input to a lookup table to determine how to operate on the central 2×2 pixels to implement halfbit or fullbit dilation and erosion in U.S. Pat. No. 5,483,351 titled "DILATION OF IMAGES WITHOUT RESOLUTION CONVERSION TO COMPENSATE FOR PRINTER CHARACTERISTICS". This requires knowing some of the surrounding pixels when deciding how to dilate or erode the pixels in the center.

Eschbach teaches in U.S. Pat. No. 5,258,854 titled "CONVERTING BETWEEN WRITE-WHITE, WRITE-BLACK, AND NEUTRAL BITMAPS", how to resize bitmap images in small amounts less than one full bit in size. Eschbach states that the erosion and dilation may be by differing amounts in the x and y directions, and that the amount of resizing may be a fraction of a full pixel.

Loce, et al teaches logically combining two morphological filter pairs and an original image to create an output image in U.S. Pat. No. 5,680,485 titled "METHOD AND APPARATUS EMPLOYING EROSION-BASED FILTER PAIRS FOR IMAGE MAPPING". The morphological filters described are erosion filters, one of which has less erosion than desired and the other having more erosion than desired Logically combining combinations of the original image with the two eroded images provides for a method of obtaining an intermediate result.

Eschbach describes a method of resizing an input bitmap in U.S. Pat. No. 5,208,871 titled "PIXEL QUANTIZATION WITH ADAPTIVE ERROR DIFFUSION" Eschbach simulates a scan of an output image from an input bitmap such that the scan resolution is different from the input bitmap. Error diffusion is utilized to quantize the output bitmap into the desired output bit resolution This example uses en-or diffusion to spread out the error in the quantization of a multilevel pixel into a reduced number of output states.

None of the afore mentioned patents address the issues associated with adjusting the halftone bitmap image dot shape up and down the tone scale. U.S. Pat. No. 6,115,140, inventors Bresler and Nosko, issued Sep. 5, 2000, is of interest. This patent teaches a method for color correcting a halftone bitmap image using a dilation and erosion based filtering process which generates a set of filtered halftone bitmap images that can be merged together to create a color corrected halftone bitmap image. The process has several limitations that limit its quality and usefulness In their process, Bresler and Nosko take an original halftone bitmap image and perform the morphological filtering process of dilation and erosion to create a series of filtered halftone bitmaps images. In their process, they teach a method where their dilation process adds a complete layer of on pixels around the original halftone dot features present in the halftone bitmap image. This process is illustrated in FIG. 9 of this patent application. Notice that in FIG. 9 three levels of dilation of the original feature are shown. Also referring to FIG. 9 the original bitmap (700) is dilated to produce a once-dilated bitmap (702). Subsequent dilation of the once-dilated bitmap (702) produces a twice-dilated bitmap (704). Subsequent dilation of the twice-dilated bitmap (704) produces a three-times dilated bitmap (706)

Their output halftone bitmap image consists of a dithered (or weighted) combination of the dilated or eroded halftone bitmap images. The dithering operation is controlled by continuous-tone estimates of the halftone bitmap images generated using a descreening process. This dithering operation can take on the form of simple fixed threshold or more complicated variable threshold techniques. Inherently, this process suffers from rounding errors that can produce unwanted texture into the resulting bitmap.

SUMMARY OF THE INVENTION

According to the present invention, there is provided a solution to these problems.

According to a feature of the present invention, there is provided a method for color correcting an original halftone bitmap image by a predefined color correction function to produce a color corrected halftone bitmap image comprising:

providing an original halftone bitmap image;

estimating the dot area percentage of said original halftone bitmap image in a set of sub-image blocks;

calculating an aim dot area percentage, based on a predefined color correction function, for each sub-image block in said original halftone bitmap image;

calculating the number of halftone bitmap image pixels to convert to on or off states to produce a modified original halftone bitmap image that has the aim dot area percentage where said value is designated by N, for each sub-image block in said original halftone bitmap image; and converting N pixels in said original halftone bitmap image to either on or off states depending on whether the aim dot area percentage is greater or less than the dot area percentage of said original halftone bitmap image respectively, for each sub-image block in the original halftone bitmap image.

ADVANTAGEOUS EFFECT OF THE INVENTION

The invention has the following advantages.

1 In the present invention the morphological filtering operations of erosion and dilation are used with the expressed intent of identifying the interior and exterior boundaries of the halftone dot, in a given region of the halftone bitmap image Identification of these boundary regions gives the mechanism used to grow or shrink the halftone dots in a precise manner. Also, there is no need to generate candidate dot patterns to be combined to produce an estimate of the desired halftone dot 2 By creating the edge mask, the present invention allows for the correct number of on pixels to be added to or removed from the original halftone dot directly As a result, the current invention has the minimum amount of possible rounding error (i e, one half of one pixel error) associated with the percent area coverage that can be added to a given halftone dot, in a digital bitmap. In addition, any residual dot area error associated with adding single pixels to a given halftone dot can be diffused to neighboring dots. This results in smoother textures than are possible in known processes.

3. Another advantage of the present invention is that is allows the pixels to be added to the edges of the existing halftone dots in any order. This added control allows the current invention to be adaptable to different dot shapes. This process is not taught in the prior art 4 Yet another advantage is that only the local dot area percentage of the original halftone bitmap image needs to be calculated. There are no intermediate halftone bitmap images to descreen This can provide a significant efficiency gain in the overall process.

BRIEF DESCRIPTION OF THE DRAWINGS

FIG. 2 is a flow diagram of the high-level description of local dot area coverage estimation and block generation.

FIGS. 5a–5c are diagrammatic views illustrating the process used to locate the exterior-boundary (EB) and to create the edge mask (m) for an input feature B FIG. 6 is a diagrammatic view illustrating an example order selection matrix.

FIGS. 8a–8c are diagrammatic views illustrating the process used to locate the interior boundary (IB) and to create the edge mask (m) for an input feature (B)

DETAILED DESCRIPTION OF THE INVENTION

The present invention offers an efficient technique to adjust the dot sizes of bitmap image files such that the color and tone of the bitmap files can be adjusted prior to printing These bitmap files can consist of single channel bitmaps such as those for a single color device (e.g., a black-and-white laser printer), those for a CMYK output device (e g, a printing press or a graphic-arts proofer), or any output device that utilizes bitmap files of any number of channels (e.g., a multi-ink inkjet printer) In the present invention the color and tone of the bitmap files are adjusted by growing or shrinking the size of the bitmap dots using an erosion/dilation based halftone dot-growth technique using a dot edge-detection scheme In short, this technique identifies the edges of the halftone dots and either selectively adds or removes binary pixels (bitmap dots) to or from these edges to control the size of the halftone dots. The edges of the halftone dots are obtained using the morphological image processing technique of boundary detection using dilation and erosion depending on whether the dot in question needs to increase in size or decrease in size respectively. The exterior boundary of a dot feature is detected using a dilation based boundary detection process. The interior boundary of a dot feature is detected using an erosion based boundary detection process The structuring elements used in the edge detection process can be tailored depending on the dot-growth task. The amount that a given dot percentage needs to grow or shrink is defined by a dot-gain curve.

Figure 1:
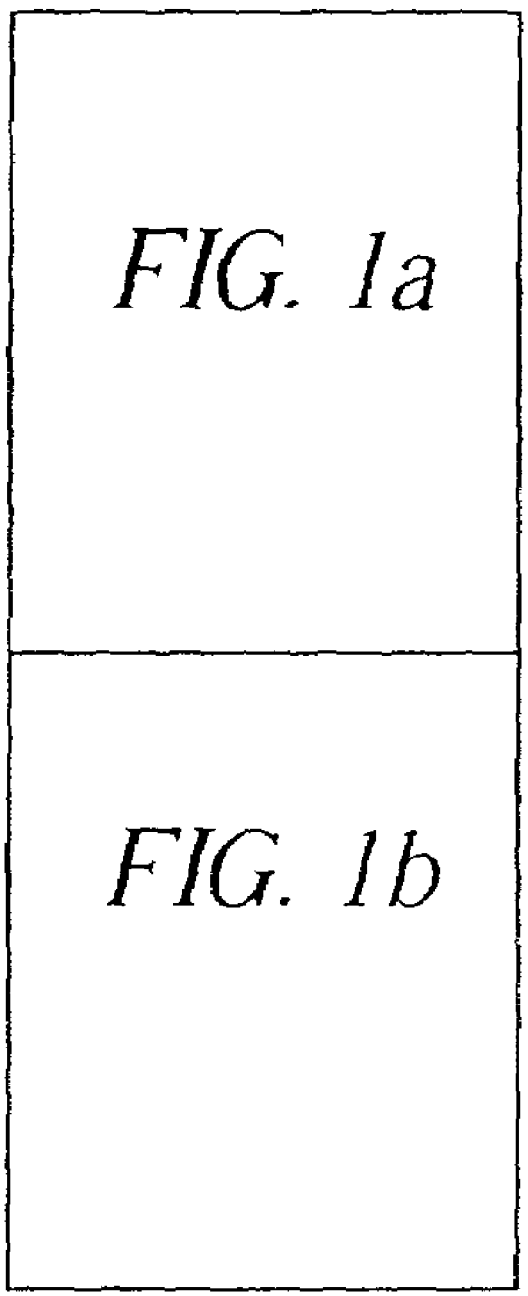
FIG. 1 is a flow diagram of the high-level processing flow for the dot-growth algorithm.
Figure 1A:
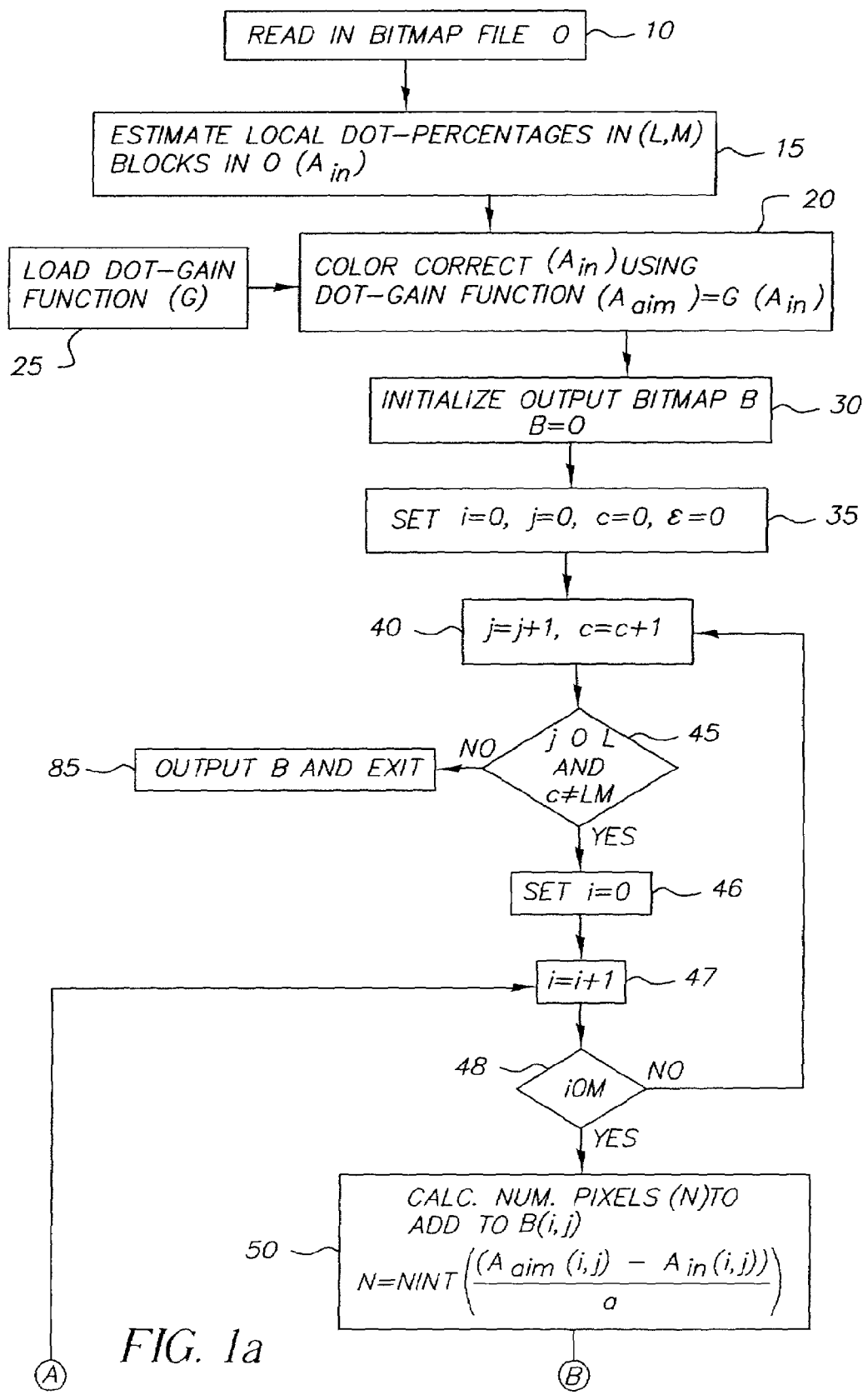
Figure 1B:
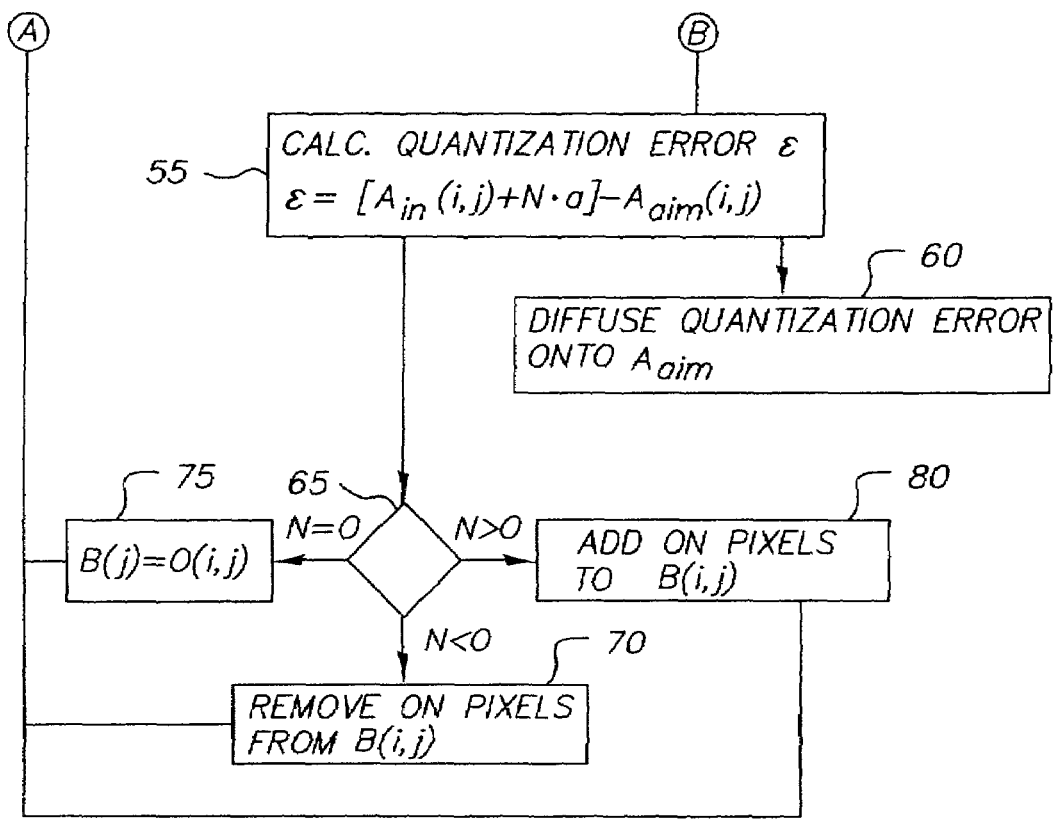
Figure 3A:
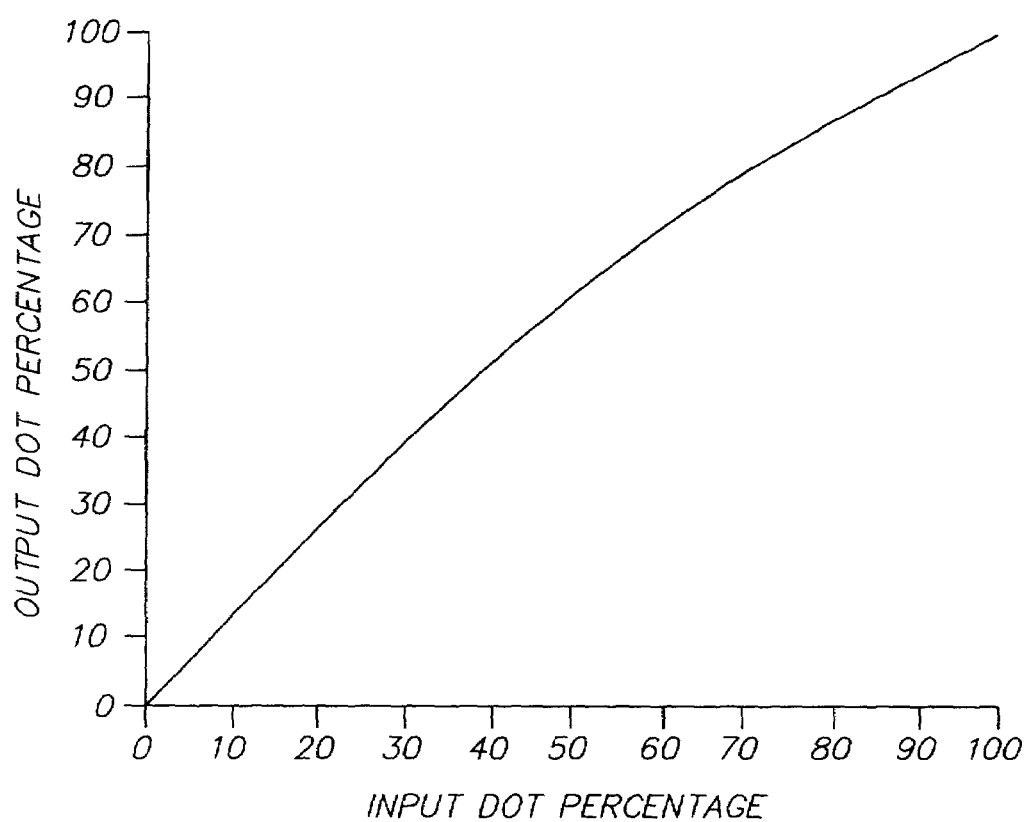
FIG. 3a is a graphical illustration of an example dot-gain function showing a typical dot-in versus dot-out dot-gain curve
Figure 3B:
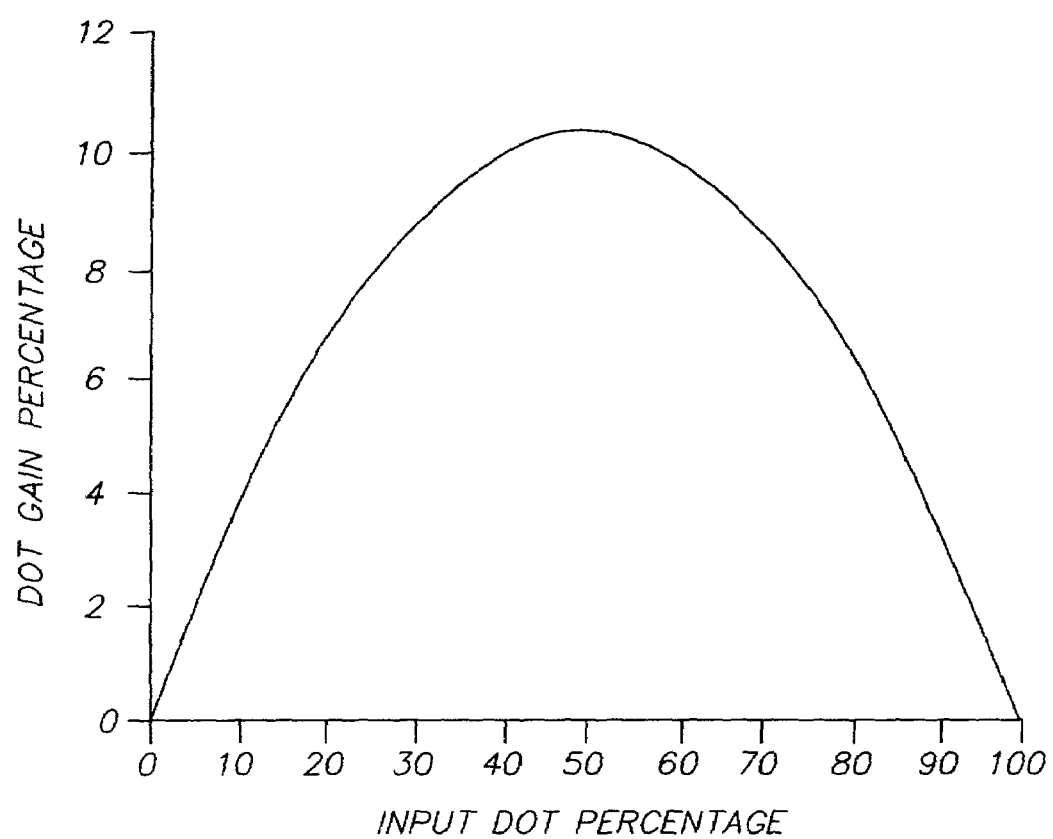
FIG. 3b is a graphical illustration of an example dot-gain percentage as a function of input dot

A high-level flow diagram for the current invention is given in FIG. 1. In this invention an original bitmap file (O) is input to the algorithm (10). The image is processed in blocks smaller than the total bitmap size (15). Preferably these blocks correspond to approximately the halftone cell size of the halftone screen used to create the bitmap The dot-area percentage of these blocks is estimated using a low-pass filter, decimation, and interpolation process (15). A high level description of this process (15) is shown in FIG. 2. The estimated dot-percentages for the original bitmap ($A_{in}$) are converted to aim dot percentages $A_{aim}$ using the dot-gain curve (G) (25) dictating the amount of gain required for the given input dot percentage (20) An example dot-gain function is shown in FIGS. 3(a) and 3(b) (Note it is understood that this function could take on different forms) The dot-gain relationship, is illustrated in two forms—FIG. 3a shows the output dot percentage as a function of the input dot percentage; FIG. 3b. shows the actual dot-gain as a function of input dot percentage.

Referring again to FIG. 1, an output bitmap (B) is initialized (30) to be equivalent to the input bitmap (O) (Note: the output bitmap has the same number of pixels as the input bitmap) The output image (B) is comprised of L×M blocks as determined in (15) where (j=1,2,3 . . . L, i=1,2, 3 . . . M). The output bitmap (B) is adjusted in an iterative manner by processing each block in B. The algorithm begins by initializing block variables i, j, and c to zero where i and j are the coordinates of the current block and c is a counter that records the number of blocks that have been processed (35) Also the variable $\epsilon$, corresponding to the quantization error associated with the current block (i e., B(i,j)), is set to zero (35).

A two-dimensional loop (on i and j), over the blocks in B, is established in steps {40, 45, 46, 47, and 48} This two-dimensional loop (on i and j) controls the indexing into the calculations performed in steps {50, 55, 60, 65, 70, and 80}. The two-dimensional loop is performed until all of the blocks in B are processed (i e, c=L×M) as shown in step (45).

Therefore, while c≦L×M the processing of each block in B consists of:

Calculation of the number of pixels (N) to be added or removed from the (i,j)$^{th}$ block of B (50) such that the percent area coverage of the (i,j)$^{th}$ block of B approximates $A_{aim}$(i, j) The value for N is calculated using, $$N = NINT\left(\frac{(A_{aim}(i,j) - A_{in}(i,j))}{a}\right), \quad (1)$$

where NINT returns the nearest integer of its input and a is the area of one pixel within the (i,j)$^{th}$ block. Therefore, a is defined by:

$$a = \frac{1}{r \cdot c}, \quad (2)$$

where r and c are the number of pixels in the vertical and horizontal dimensions of B(i,j).

Calculation of quantization error ($\epsilon$) (55) Since the NINT operator was used to calculate N, there will be some quantization-induced error between the aim ($A_{aim}$(i,j)) and actual percent area coverage of B(i,j). This error is given by:

$$\epsilon = [A_{in}(i,j) + N \cdot a] - A_{aim}(i,j) \quad (3)$$

Diffusion of quantization error ($\epsilon$) (60). In order to reduce the visual effects of this quantization the error ($\epsilon$) can be diffused onto the neighboring pixels of $A_{aim}$ using a suitable error-diffusion scheme (60). One such scheme is error diffusion using the Floyd-Steinberg diffusion weights. (It should be recognized that this example was chosen for illustration purposes. In practice other error diffusion schemes could be used)

Grow (65) on/off pixels (70,75, or 80). Given the current value of N add, remove, or leave constant the number of on/off On and off pixels in a binary image are defined as on=1 and off=0 Pixels in B(i,j) according the following rules:

IF N=0 leave the number of on/off pixels in B(i,j) the same (75).
IF N<0 remove N of the on pixels from B(i,j) according to the scheme given in (70)
IF N>0 add N on pixels to B(i,j) according to the scheme given in (80).

Once all of the L×M blocks in B have been processed the modified bitmap is stored to disk or sent to the destination-printing device (85).

Referring now to FIG. 2, the process (15) of estimating the local area dot percentages of the original bitmap (O) consists of a low-pass filtering and sub-sampling O. First, a down-sampling factor R is calculated based on the ratio of the dpi and lpi of the bitmap O (600) (This relationship is one example of a process used to specify the down-sampling rate (R). In practice a different criterion could be used to set this value) The original bitmap is padded to be an integer multiple of the down-sampling rate (605). The process used to create the local area dot percentages uses down-by-two decimations followed by a final bilinear interpolation. Each down-by-two decimation stage corresponds to a down-sampling rate of 2 Thus there are, $\log_2(R)$ down-by-two decimations in R. By definition, the number of down-by-two decimations needs to be an integer. Thus, the number of down-by-two decimations (n) is calculated by (610):

$$n = NINT(\log_2(R)) \quad (4)$$

Given the padded original bitmap an output continuous tone image ($A_{in}$) is initialized to be equal O (615). Next, a conditional loop in i, over the range i=1,2,3 . . . n, is established in {625 and 630} to iteratively low-pass filter {635 and 645} and sub-sample {640 and 650} $A_{in}$ n times. During each iteration, the low-pass filtering and sub-sampling is performed separably First, $A_{in}$ is convolved with a horizontal averaging kernel ($F_H$) (635) Next the horizontally filtered image is sub-sampled by 2 times in the horizontal direction This process is repeated in the vertical direction using a vertically oriented averaging kernel ($F_V$) (645) and a 2 times sub-sampling process (650). After $A_{in}$ has been low-pass filtered and 2 times sub-sampled n times, it is scaled one final time by the factor $2^n/R$ to its final size (655). (Note. This process illustrated here is only one example of a process to estimate the local area dot percentage of O. In the spirit of this invention, it should be recognized that other processes exist for converting a bitmap to a set of local area dot percentage estimates.)

Figure 4:
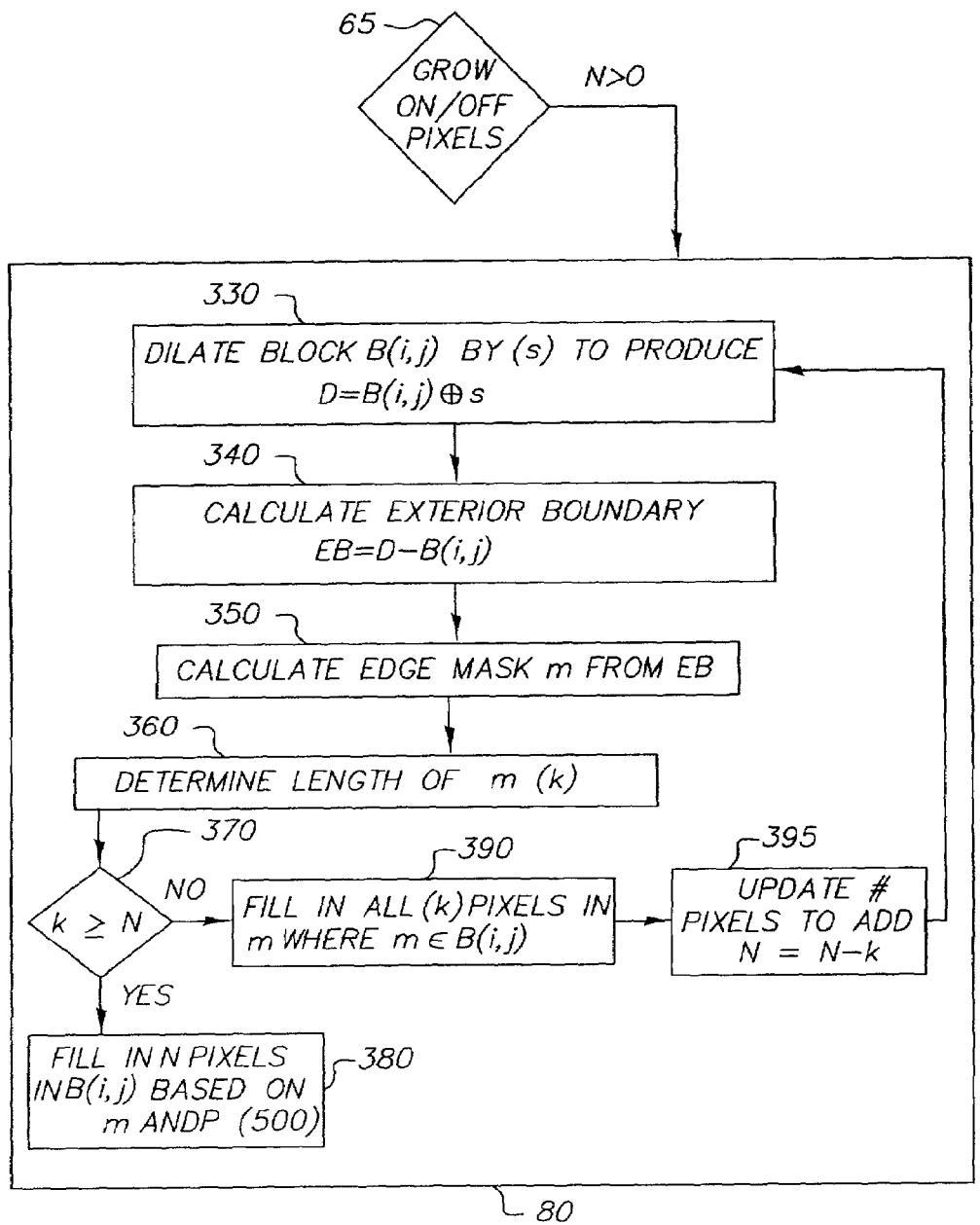
FIG. 4 is a flow diagram showing a high-level description of the process to add pixels to the exterior boundary of a dot feature.

Referring to FIG. 4, given N and a given block of B, the scheme used to add on pixels to B(i,j) (80) starts by dilating B(i,j) using a binary-structuring element (s), such as that shown in Eq 5, to produce a dilated version of the output (D) (330) (Note the symbol ⊕ is used to denote dilation).

$$D = B(i, j) \oplus s, \text{ where } s = \begin{bmatrix} 1 & 1 & 1 \\ 1 & 1 & 1 \\ 1 & 1 & 1 \end{bmatrix} \quad (5)$$

Next (340), the exterior boundary (EB) of the feature given in B (i,j) is determined using the relationship given in Eq 6

$$EB = D - B(i,j) = (B(i,j) \oplus s) - B(i,j) \quad (6)$$

Figure 5C:
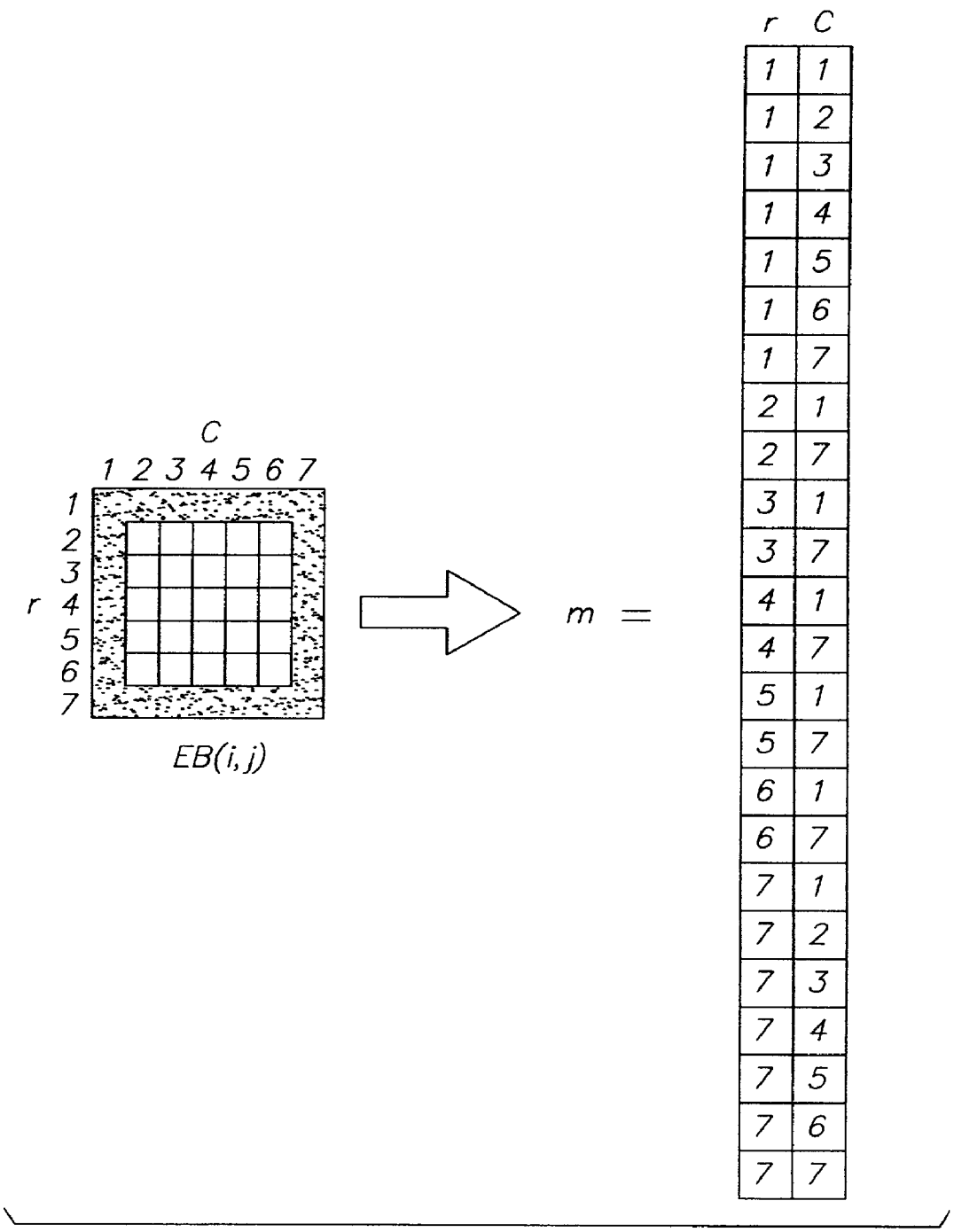

Isolation of the exterior-boundary elements in EB is performed by locating the on pixels contained within the region of support of EB. These discrete locations correspond to what will be referred to as the edge mask (m) (350) for the current block (i,j) Therefore, m is a k element vector that contains the positions where the EB image is on Therefore, using the edge mask as a guide, a total of k exterior-boundary pixels are candidates for feature growth (360). The process formalized in Eq. 5 and Eq. 6 is illustrated in FIG. 5(*a*)–5(*c*). Referring to FIG. 5(*a*) B(i,j) is dilated by a symmetrical structuring element (s) to produce D. Referring to FIG. 5(*b*) the exterior boundary (EB) is created by subtracting B(i,j) from D. Referring to FIG. 5(*c*) the edge mask (m) is created by storing the locations of the on pixels in EB.

If k is greater than or equal to N (370), then the edge mask m contains enough exterior-boundary locations to grow the feature in B(i,j) to the aim percent area coverage Therefore, the first N pixels in B(i,j), contained in the edge mask list m are converted to on pixels (380). The order in which the pixels in B(i,j) are converted to on pixels can be ordered or random. This order is controlled by an order-selection matrix (P) (500) An example order-selection matrix (P) is shown in FIG. 6. In this example the block B(i,j) is 7×7 pixels. The numbers in the matrix correspond to the order, from lowest to highest, in which on pixels are added to B(i,j). Thus, if the edge mask m contains pixel locations in B(i,j) corresponding to several locations in P, the pixel location in m corresponding to the smallest P value is turned on first. Subsequent pixels in B(i,j) are turned on in a pattern corresponding to increasing P value, for each location stored in m. (Note: The P values associated with the points in m need not be adjacent. For example, a given four element m vector may point to pixel locations that have P values of {1, 9, 3, 8}. Given the above logic, the pixels in B(i,j) are turned on in the order of {m(1), m(3), m(4), m(2)}).

If k is less than N (370), then the edge mask m does not contain enough exterior-boundary locations to grow the feature in B(i,j) to the aim percent area coverage. Therefore, all k pixels in B(i,j), contained in the edge mask list m, are converted to on pixels (390). Since the aim dot growth requires converting N off pixels in B(i,j) to on pixels, B(i,j) is iteratively dilated by s (330), converted to an exterior-boundary mapping (340); converted to an edge mask (350); and filled in until all N off pixels have been converted to on pixels (380 and 390). During each iteration, the number of on pixels needed in the next iteration is updated by adjusting N by the number of on pixels generated in the current iteration (i.e., N=N−k) (395)

Figure 7:
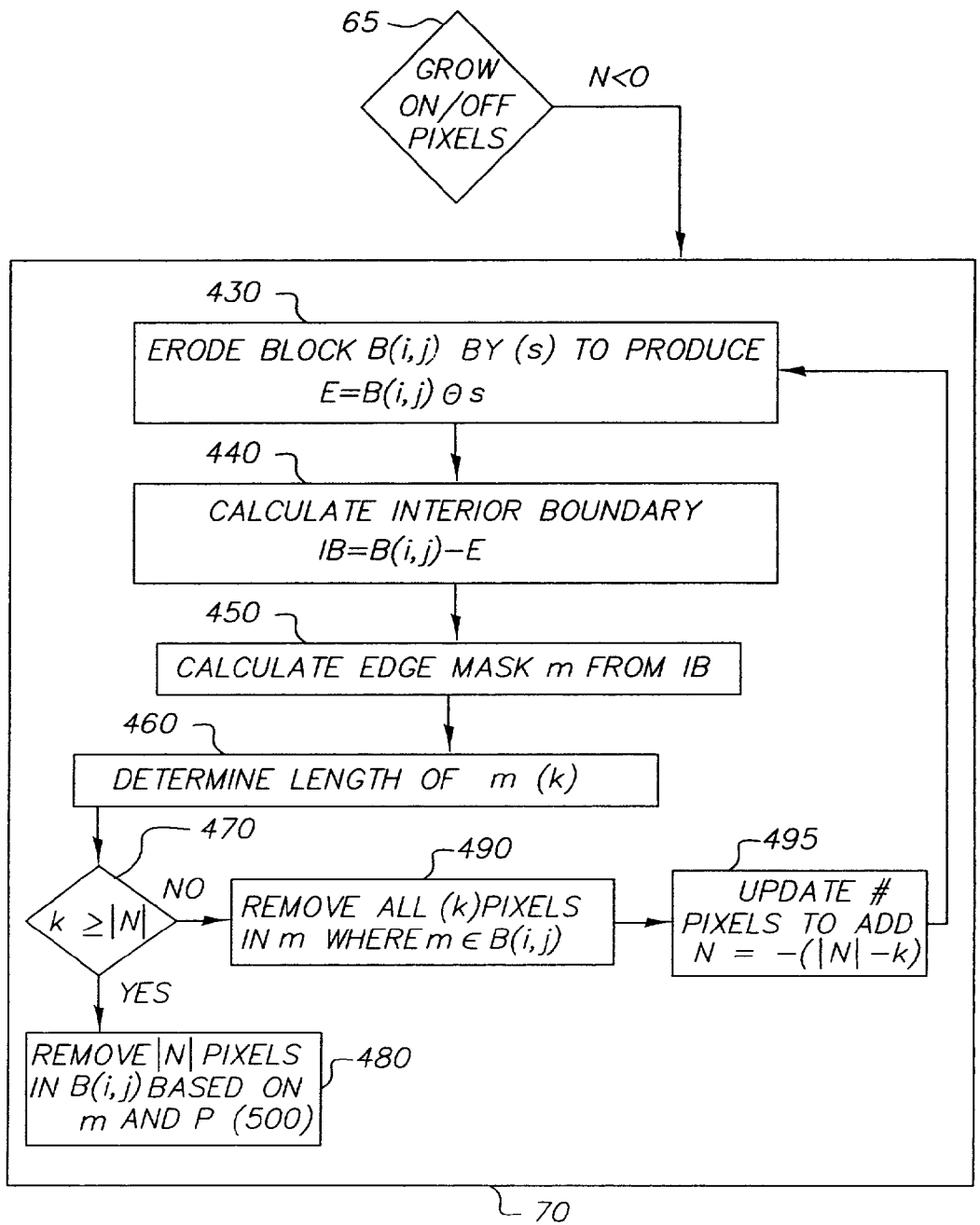
FIG. 7 is a flow diagram showing a high-level description of the process to subtract pixels from the interior boundary of a dot feature.

Referring to FIG. 1, the process for removing on pixels from B(i,j) (70) is shown in FIG. 7 For a given N and a given block of B, the scheme used to remove on pixels from B(i,j) (70) starts by eroding B(i,j) using a binary-structuring element (s), such as that shown in Eq. 7, to produce an eroded version of the output (E) (430) (Note erosion is denoted by the symbol ⊖).

$$E = B(i, j) \ominus s, \text{ where } s = \begin{bmatrix} 1 & 1 & 1 \\ 1 & 1 & 1 \\ 1 & 1 & 1 \end{bmatrix} \quad (7)$$

Next (440), the interior boundary (IB) of the feature given in B(i,j) is determined using the relationship given in Eq. 8

$$IB = B(i,j) - E = B(i,j) - (B(i,j) \ominus s) \quad (8)$$

Figures 8A, 8B:
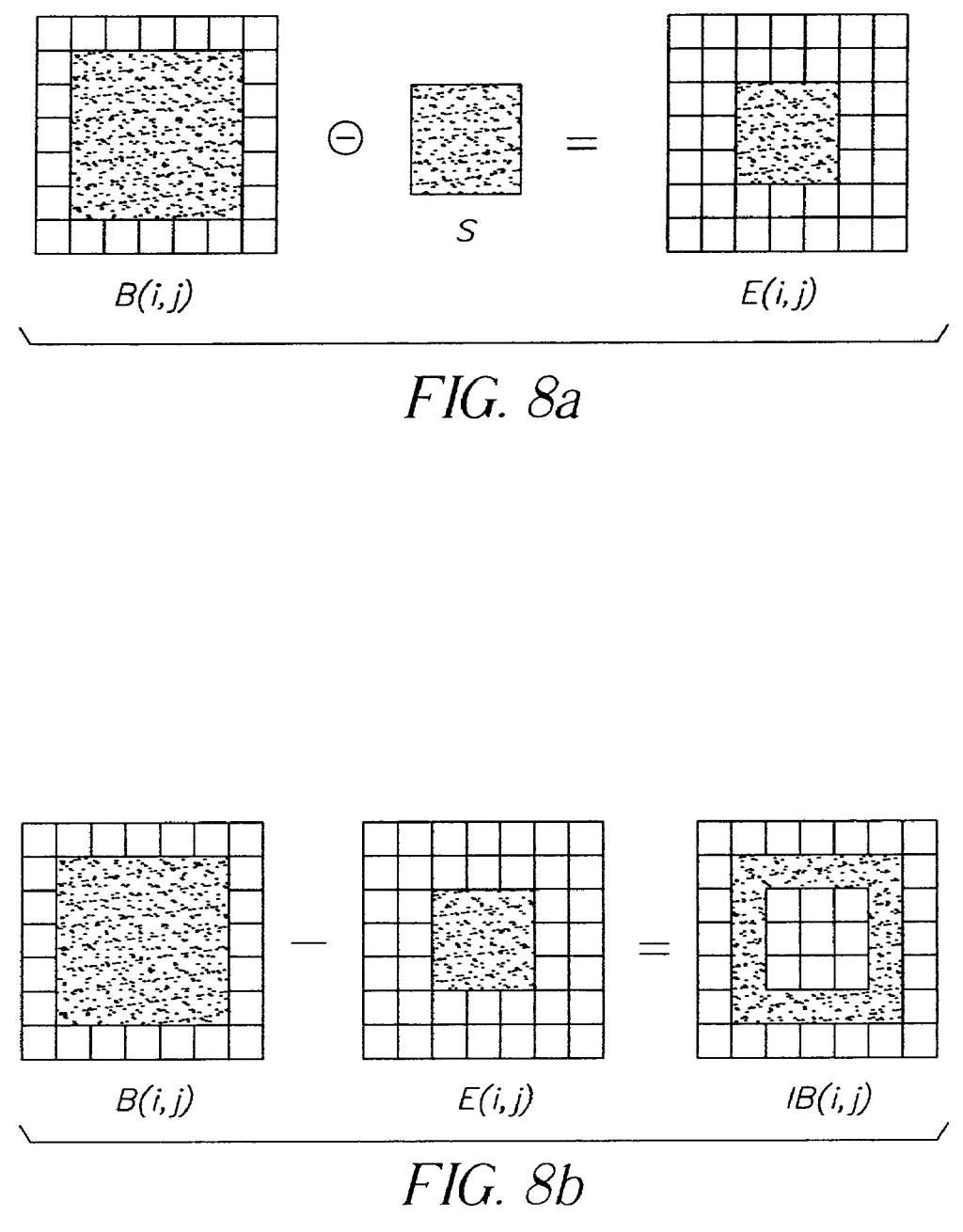
Figure 8C:
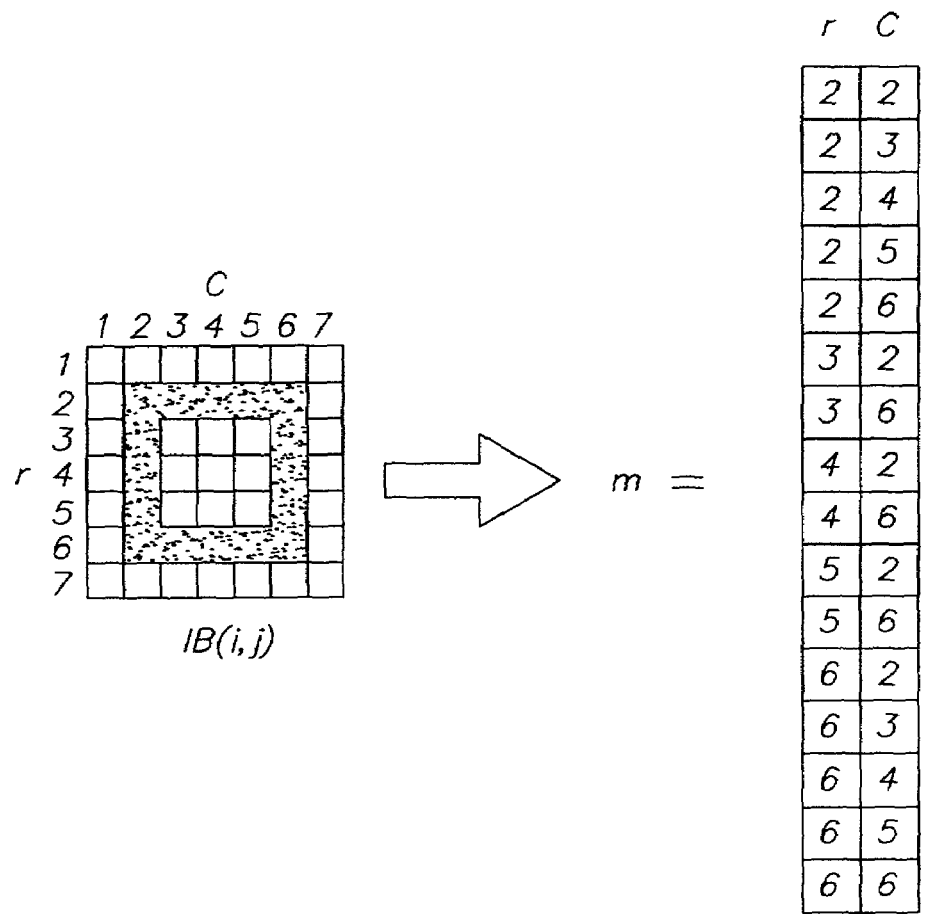
Figure 9:
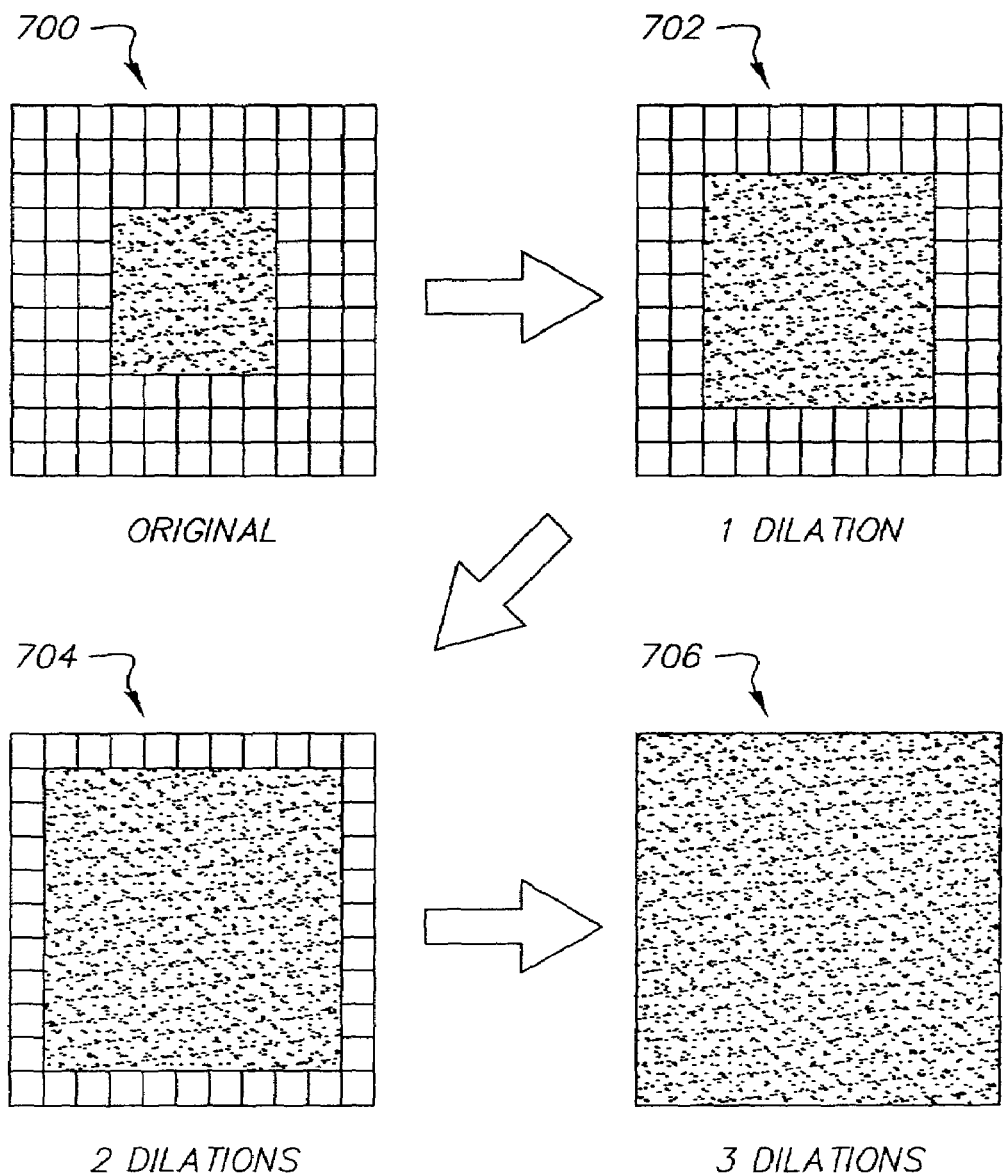
FIG. 9 is a diagrammatic view illustrating the effects of dilating an original halftone dot (700) by a symmetrical structuring element designed to add a ring of pixels to the boundary of a binary feature (702), as taught in U.S. Pat. No. 6,115,140. The illustrations in 704 and 706 represent single and double subsequent dilations of 702 with the same structuring element.

Isolation of the interior-boundary elements in IB is performed by locating the on pixels contained within the region of support of IB. These discrete locations correspond to what will be referred to as the edge mask (m) (450) for the current block (i,j). Therefore, m is a k element vector that contains the positions where the IB image is on. Therefore, using the edge mask as a guide, a total of k interior-boundary pixels are candidates for feature shrinkage (460) The process formalized in Eq. 7 and Eq 8 is illustrated in FIG. 8. Referring to FIG. 8, the original feature B(i,j) is eroded by a symmetrical structuring element (s) to produce E(i,j). Referring to FIG. 8(*b*), the interior boundary (IB) is created by subtracting E(i,j) from B(i,j). Referring to FIG. 8(*c*), the edge mask (m) is created by storing the locations of the on pixels in IB.

Referring to FIG. 7, if k is greater than or equal to |N| (470) then the edge mask m contains enough interior-boundary locations to shrink the feature in B(i,j) to the aim percent area coverage. Therefore, the first |M| pixels in B(i,j), contained in the edge mask list m are converted to off pixels (480). The order in which the pixels in B(i,j) are converted to off pixels can be ordered or random. This order is controlled by an order-selection matrix (P) (500). An example order-selection matrix (P) is shown in FIG. 6. In this example the block B(i,j) is 10×10 pixels. The numbers in the matrix correspond to the order, from lowest to highest, in which on pixels are removed from B(i,j). Thus, if the edge mask m contains pixel locations in B(i,j) corresponding to several locations in P, the pixel location in m corresponding to the smallest P value is turned off first. Subsequent pixels in B(i,j) are turned off in a pattern corresponding to increasing P value, for each location stored in m. (Note: The P values associated with the points in m need not be adjacent. For example, a given four-element m vector may point to pixel locations that have P values of {1, 9, 3, 8} Given the above logic, the pixels in B(i,j) are turned off in the order of {m (1), m(3), m(4), m(2)}.)

If k is less than |N| (470), then the edge mask m does not contain enough interior-boundary locations to shrink the feature in B(i,j) to the aim percent area coverage. Therefore, all k pixels in B(i,j), contained in the edge mask list m, are converted to off pixels (490) Since the aim dot shrinkage requires converting |N| on pixels in B(i,j) to off pixels, B(i,j) is iteratively eroded by s (430); converted to an interior-boundary mapping (440); converted to an edge mask (450); and filled in until all |A| on pixels have been converted to off pixels (480 and 490) During each iteration the number of off pixels needed in the next iteration, is updated by adjusting N by the number of off pixels generated in the current iteration (i e, N=−(|N|−k)) (495).

An application for the present invention is for RIP-once-output-many (ROOM) systems. These are systems such as digital proofers that take in press-ready bitmap files and produce adjusted bitmap files that can be used in a digital proofing system. In this scenario, the press-ready bitmap file is adjusted such that when printed on a given digital proofing system the resultant proof has the correct color and tone characteristics.

The invention has been described in detail with particular reference to certain preferred embodiments thereof, but it will be understood that variations and modifications can be effected within the spirit and scope of the invention.

PARTS LIST

- 10 read in bitmap file
- 15 estimate local dot-percentages in blocks
- 20 color correct using dot-gain function
- 25 load dot-gain function
- 30 initialize output bitmap B
- 35 initialize two dimensional loop process and error process
- 40 two dimensional loop process
- 45 two dimensional loop process
- 46 two dimensional loop process
- 47 two dimensional loop process
- 48 two dimensional loop process
- 50 calculation of number of pixels to be added or removed from block of B
- 55 calculation of quantization error
- 60 calculation of error-diffusion scheme
- 65 calculation of on/off pixels
- 70 removal of on pixels process
- 75 no-opt process
- 80 addition of on pixels process
- 330 calculate dilated version
- 340 calculate exterior boundary
- 350 calculate edge mask
- 360 determine length
- 370 calculation
- 380 add on pixels process
- 390 add on pixels process
- 395 number of pixels to add
- 430 calculate eroded block version
- 440 calculate interior boundaiy
- 450 calculate edge mask
- 460 determine length
- 470 calculation
- 480 remove |N| edge pixels
- 490 remove all edge pixels
- 495 update number of pixels
- 500 order-selection matlix
- 600 calculate down-sampling rate
- 605 bitmap padded to an integer multiple blocks
- 610 down-by-two decimations calculated
- 615 continuous tone image is initialized
- 620 set
- 625 conditional loop -continued

PARTS LIST

- 630 conditional loop
- 635 horizontal averaging process
- 640 sub-sample
- 645 vertical averaging process
- 650 sub-sample
- 655 scale dimensions using bilinear interpolation
- 700 input binary feature
- 702 once dilated binary feature
- 704 twice dilated binary feature
- 706 trice dilated binary feature

What is claimed is:

1. A method for color connecting an original halftone bitmap image by a predefined color correction function to produce a color corrected halftone bitmap image comprising:

providing an original halftone bitmap image;

estimating the dot area percentage of the original halftone bitmap image in a set of sub-image blocks;

calculating an aim dot area percentage, based on a predefined color correction function, for each sub-image block in said original halftone bitmap image;

calculating the number of halftone bitmap image pixels to convert to on or off states to produce a modified original halftone bitmap image that has the aim dot area percentage where said value is designated by N, for each sub-image block in said original halftone bitmap image, and converting N pixels in said original halftone bitmap image to either on or off states depending on whether the aim dot area percentage is greater or less than the dot area percentage of said original halftone bitmap image respectively, for each sub-image block in said original halftone bitmap image.

2. The method of claim 1 wherein the process of estimating the dot area percentage of the original halftone bitmap image in a set of sub-image blocks includes recursively lowpass filtering, sub-sampling, and then interpolating said original halftone bitmap image until it possesses the desired number of sub-image blocks.

3. The method of claim 1 wherein the process of calculating the number of halftone bitmap image pixels (N) to convert to on or off states to produce a modified original halftone bitmap image that has the aim dot area percentage includes:

first computing the difference between the aim dot area percentage and the estimated dot area percentage of said original halftone bitmap image, for a given sub-image block of the color corrected halftone bitmap image and a corresponding block of said original halftone bitmap image; and converting this difference to the number of halftone bitmap image pixels to modify, in the current block of said original halftone bitmap image, by dividing said difference by the dot area percentage of a single halftone bitmap image pixel and rounding the result of this division to the nearest integer value.

4. The method of claim 1 wherein the process of converting |N| on pixels (where |N| represents the absolute value of the value of N), in a given block of said original halftone bitmap image, to |N| off pixels, in a corresponding block of the color corrected halftone bitmap image, includes:

calculating an edge mask of the interior-boundary pixels of the halftone bitmap image contained in a given block;

counting the number of interior-boundary pixels in the current block, where said value is designated by k, converting $|N|$ on pixels present in the edge mask to off pixels, for the case where $k \geq |N|$, or converting all pixels of the edge mask to off pixels, for the case where $k < |N|$, updating the number of pixels to convert in the current block by creating a modified N value equal to $-(|N|-k)$, and recursively repeating said calculating, counting, converting and updating until the modified value of N is zero for the current block.

5. The method of claim 1 wherein the process of converting N off pixels, in a given block of said original halftone bitmap image, to N on pixels, in a corresponding block of the color corrected halftone bitmap image includes:

calculating an edge mask of the exterior-boundary pixels of the halftone bitmap image contained in a given block counting the number of exterior-boundary pixels in the current block, where said value is designated by k, converting N off pixels present in the edge mask to on pixels, for the case where $k \geq N$, or converting all pixels of the edge mask to on pixels, for the case where $k < N$, updating the number of pixels to convert in the current block by creating a modified N value equal to N−k, and recursively repeating said calculating, counting, converting, and updating until the modified value of N is zero for the current block.

6. The method of claim 4 wherein the process of calculating the interior-boundary pixels of the halftone bitmap image contained in a given block includes:

eroding the halftone bitmap image in the current block by a symmetrical morphological structuring element that removes one layer of on pixels from the perimeter of the halftone bitmap image in the current block; and calculating the interior-boundary image of the halftone bitmap image, for the current block, by computing the difference between the halftone bitmap image for the current block and the eroded halftone bitmap image for the current block.

7. The method of claim 5 wherein the process of calculating the exterior-boundary pixels of the halftone bitmap image contained in a given block includes first dilating the halftone bitmap image in the current block by a symmetrical morphological structuring element that adds one layer of on pixels to the perimeter of the halftone bitmap image in the current block; and calculating the exterior-boundary image of the halftone bitmap image, for the current block, by computing the difference between the dilated halftone bitmap image for the current block and halftone bitmap image for the current block.

8. The method of claim 4 for converting on pixels present in the edge mask to off pixels includes:

recursively converting halftone bitmap image pixels, for the current block, identified in the edge mask, calculated from the interior-boundary calculation, to off pixels according their position in a predefined order-selection matrix.

9. The method of claim 5 for converting off pixels present in the edge mask to on pixels includes:

recursively converting halftone bitmap image pixels, for the current block, identified in the edge mask, calculated from the exterior-boundary calculation, to on pixels according their position in a predefined order-selection matrix.

10. The method of claim 8 wherein the order selection matrix includes:

using an image mask of the same dimensions as the sub-image blocks of the original halftone bitmap image whose elements contain numbers from one to the number of pixels in the sub-image blocks, where these numbers are randomly positioned within the image mask and correspond to the order in which pixels are converted from on-to-off or from off-to-on.

11. The method of claim 8 where the order selection matrix includes:

using an image mask of the same dimensions as the sub-image blocks of the original halftone bitmap image whose elements contain numbers from one to the number of pixels in the sub-image blocks, where these numbers are ordered, according to a desired dot growth pattern, within the image mask and correspond to the order in which pixels are converted from on-to-off or from off-to-on.

12. The method of claim 9 wherein the order selection matrix includes:

using an image mask of the same dimensions as the sub-image blocks of the original halftone bitmap image whose elements contain numbers from one to the number of pixels in the sub-image blocks, where these numbers are randomly positioned within the image mask and correspond to the order in which pixels are converted from on-to-off or from off-to-on.

13. The method of claim 9 wherein the order selection matrix includes:

using an image mask of the same dimensions as the sub-image blocks of the original halftone bitmap image whose elements contain numbers from one to the number of pixels in the sub-image blocks, where these numbers are ordered, according to a desired dot growth pattern, within the image mask and correspond to the order in which pixels are converted from on-to-off or from off-to-on.

14. The method of claim 1 wherein said original halftone bitmap image includes:

one of the halftone bitmap images of a multiple separation halftone bitmap image.

15. The method of claim 1 wherein the color correction function includes:

sets of channel independent color correction functions.

16. The method of claim 1 wherein the color correction function consists of sets of channel independent color correction functions and multi-dimensional color correction functions that consider interactions between the channels of a multiple separation halftone bitmap image.

* * * * *